2,700,042
Patented Jan. 18, 1955

UNITED STATES PATENT OFFICE 2,700,042

PRODUCTION OF PYRIDINE AND BETA PICOLINE

Robert S. Aries, New York, N. Y.

No Drawing. Application August 30, 1952,
Serial No. 307,368

6 Claims. (Cl. 260—290)

This invention relates to the production of nitrogen containing heterocyclic bases, and more particularly it relates to the production of pyridine and beta picoline.

Pyridine and its alkyl homolog, beta picoline, are important intermediates and solvents useful in the synthesis of antihistamines, sulfa drugs, mildew-proofing agents, antimalerials, quaternary germicides, vitamins, and drugs having antitubercular activity. More specifically both pyridine and beta picoline can serve as the starting raw material for the production of the important B complex vitamin niacin and its equally important derivative niacinamide. Pyridine has been used for the production of isonicotinic acid which can be converted to various derivatives possessing antitubercular activity.

The supply of these heterocyclic bases is essentially restricted by the volume of coal-tar production. Since these materials are byproducts, expansion in their production is limited.

Methods of synthesis of alkyl pyridines consists largely of the interaction of ammonia with acetaldehyde. This reaction has been reported to be carried out in the vapor phase at elevated temperature over a dehydrating type catalyst such as silica gel or alumina or mixture thereof. The resulting reaction product yields alpha picoline, gamma picoline, and 2-methyl-5-ethylpyridine as the principal products. All this work is characterized by the complete absence or at most the presence to only a minor degree of pyridine and beta picoline.

Methods for the production of pyridine or beta picoline consist of the interaction of ammonia with acrolein or alkyl alcohol using a vapor phase catalytic process. Both these raw materials are costly resulting in high cost products.

It is an object of this invention to provide an economical process for the production of pyridine and beta picoline through the catalytic condensation of ammonia with cheap available saturated aldehydes or various known polymers of these aldehydes.

This reaction is characterized by the reaction of vaporized mixtures of two saturated aldehydes or by the reaction of mixtures resulting from the vaporization of polymers of these aldehydes such as paraformaldehyde, trioxane, paraldehyde, or metaldehyde with ammonia at elevated temperature over a dehydrating type catalyst. The resulting reaction product contains appreciable quantities of pyridine and beta picoline.

I have discovered that the use of mixtures of saturated aldehydes instead of a single aldehyde resulted in the production of different reaction products from those which would be expected by the conventional method of reacting individual saturated aldehydes in a similar manner.

For example by reacting mixtures of formaldehyde and acetaldehyde or mixtures of their polymers with ammonia at elevated temperature over a dehydrating catalyst, I was able to obtain a reaction product rich in pyridine and beta picoline and largely free of alpha picoline, gamma picoline, and 2-methyl-5-ethylpyridine which are the products of the conventional ammonia-acetaldehyde reaction.

The operation of my invention is illustrated by the following examples. Numerous variations of these examples will be immediately apparent, consequently these examples should not limit the scope of this invention.

*Example 1*

Molten trioxane was pumped by means of a proportioning pump at the rate of 2.0 grams per minute into a heated pipe where it was completely vaporized. Similarly paraldehyde was vaporized at a rate of 3.0 grams per minute. Ammonia gas was admitted into the system at the rate of 6.0 liters per minute measured at substantially room temperature and atmospheric pressure. This ammonia gas stream was preheated in an electrically heated tube and the three streams were mixed in a preheat zone where the temperature of the mixture was brought up to the reaction temperature. This mixture was passed through a one-inch-electrically heated pipe maintained at the reaction temperature of 425° C. containing 300 milliliters of a catalyst which analyzes 85 per cent silica gel and 14.5 per cent alumina. The reaction was cooled down to the temperature of ice using a series of collecting flasks in ice-water baths. The resulting reaction product was extracted with ethyl ether. The extract was dried over anhydrous calcium chloride and carefully distilled through a glass fractionating column. The distillate fraction in the 113 to 117° C. range was identified as pyridine by comparing the melting point of the picrate obtained from this fraction with that of known pyridine picrate. The mixed melting point showed no depression. The fraction obtained at 125–130° C. could not be identified as alpha picoline on preparation of the picrate. Similarly the fraction obtained in the 140 to 145° range was identified as beta picoline on preparation of the picrate derivative. No 2-methyl-5-ethylpyridine could be found. The total yield of pyridine bases was approximately 60 per cent based on the aldehydes charged.

*Example 2*

Example 1 was repeated using 6.0 grams per minute of a 37 per cent solution of formaldehyde in place of trioxane and 3.0 grams per minute of acetaldehyde in place of paraldehyde. The ammonia rate was 4 liters per minute. A commercially available catalyst used for the catalytic cracking of petroleum was used in place of the previously described catalyst, and having a similar analysis and the catalyst temperature was maintained at 450° C. The reaction product was treated as in Example 1 and appreciable quantities of pyridine and beta picoline were recovered.

*Example 3*

Example 1 was repeated using 3.0 grams per minute of acetaldehyde in place of paraldehyde. Silica gel catalyst at a temperature of 400° C. was used in the reactor tube. Appreciable quantities of pyridine and beta picoline were recovered.

From the foregoing disclosure it will be recognized that the invention is susceptible of modification without departing from the spirit and scope thereof and it is to be understood that the invention is not restricted to the specific illustrations thereof herein set forth.

I claim:
1. The process which comprises reacting ammonia and a vaporized mixture of trioxane and paraldehyde in the presence of a mixture of alumina and silica gel as catalyst, and at a temperature of from about 350° C. to about 500° C., to form a mixture of pyridine bases.

2. The process which comprises reacting ammonia and a mixture of trioxane and paraldehyde at a temperature of from about 350° C. to about 500° C. in the presence of a mixture of alumina and slicia gel as catalyst to form a mixture of pyridine bases.

3. A process for the production of β-picoline which comprises reacting ammonia with a mixture of approximately equimolar quantities of acetaldehyde and formaldehyde at a temperature of from about 350° C. to about 500° C. in the presence of a mixture of alumina and silica gel as catalyst.

4. The process which comprises reacting ammonia, acetaldehyde, and trioxane in the vapor phase in the presence of silica gel as catalyst to form a mixture of pyridine bases comprising β-alkyl pyridines.

5. The process for the production of β-picoline which comprises reacting ammonia with a mixture of acetaldehyde and formaldehyde in the vapor phase at a temperature of from about 350° C. to about 500° C., and in the presence of a catalyst selected from the group consisting of alumina, silica gel, and mixtures thereof.

6. The process for the production of β-picoline which comprises reacting ammonia with a mixture of approximately equimolar quantities of acetaldehyde and formaldehyde in the vapor phase at a temperature of from about 350° C. to about 500° C. in the presence of a catalyst selected from the group consisting of alumina, silica gel, and mixtures thereof.

References Cited in the file of this patent

UNITED STATES PATENTS

| | | |
|---|---|---|
| 2,523,580 | Mahan | Sept. 26, 1950 |
| 2,615,022 | Mahan | Oct. 21, 1952 |

FOREIGN PATENTS

| | | |
|---|---|---|
| 534,494 | Great Britain | Mar. 7, 1941 |

OTHER REFERENCES

Ser. No. 387,106, Stitz (A. P. C.), published July 13, 1943.

Tschitschibabin, J. Prakt. Chem., vol. 107, pp. 122–158 (1924).